United States Patent [19]

Salemka

[11] Patent Number: 4,498,036
[45] Date of Patent: Feb. 5, 1985

[54] ADAPTIVE CONTROL SYSTEM

[75] Inventor: Robert M. Salemka, Kalamazoo, Mich.

[73] Assignee: Pneumo Corporation, Boston, Mass.

[21] Appl. No.: 522,979

[22] Filed: Aug. 15, 1983

[51] Int. Cl.³ .............................................. G05B 13/00
[52] U.S. Cl. ................................... 318/561; 318/599; 318/615; 364/148
[58] Field of Search ........................ 318/561, 615–618, 318/599, 341; 330/1 A; 364/148

[56] References Cited

U.S. PATENT DOCUMENTS

| | | | |
|---|---|---|---|
| 3,241,015 | 3/1966 | Allen | 318/561 X |
| 3,283,230 | 11/1966 | Davies et al. | 318/561 X |
| 3,504,247 | 3/1970 | Hamel | 318/561 |
| 3,759,139 | 9/1973 | Whetham | 318/561 X |
| 4,064,444 | 12/1977 | Hoang | 318/561 |
| 4,257,074 | 3/1981 | Goss | 318/561 X |
| 4,355,273 | 10/1982 | Du Vall | 318/561 |
| 4,369,400 | 1/1983 | Turner | 318/561 |

Primary Examiner—B. Dobeck
Attorney, Agent, or Firm—Maky, Renner, Otto & Boisselle

[57] ABSTRACT

A method of adaptive control for use in a controlled system having an adjustable forward loop gain and a control system apparatus for carrying out the method are disclosed. The control system measures the value of a parameter which is to be controlled and generates an error signal by comparing the measured valve of the parameter with a desired valve. The error signal is squared and the time derivative of the squared error signal is obtained. The control system compares the length of time that the derivative so obtained has a positive value to the time it has a negative value to obtain a gain control signal, and applies the gain control signal to the forward loop gain. The gain control signal reduces the adjustable forward loop gain until a preselected margin of stability in the controlled system is obtained.

16 Claims, 2 Drawing Figures

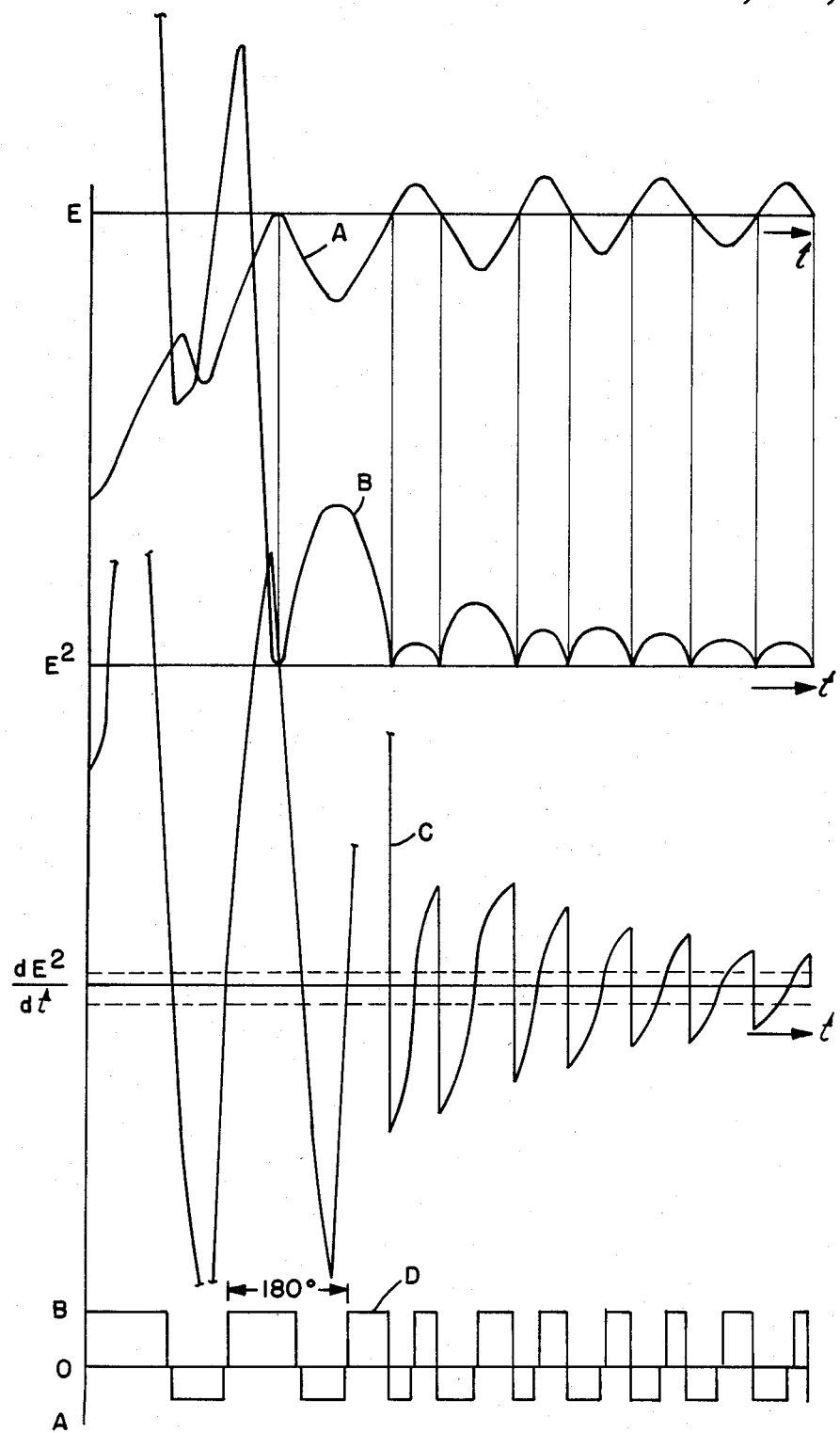

ADAPTIVE CONTROL SYSTEM

BACKGROUND OF THE INVENTION

The present invention relates to adaptive control systems.

Adaptive control systems are closed loop systems in which the gain of the system is varied according to the system's response to events that disturb it. While most controlled processes have response characteristics which vary only slightly over their entire range of operation, there are other systems where the operating characerics vary substantially. For example, a crane or the arm of a robot has different response characteristics depending on the weight of an object being moved. Many other controlled systems or processes have changing response characteristics in different portions of their operating range. One consequence is that a forward gain which provides a stable response in one portion of the operating range may make the system unstable in another portion of the operating range. For these types of controlled systems an adaptive control rather than a fixed gain control is desirable.

Most adaptive control systems have depended on knowledge of the controlled system's response characteristic. Some adaptive controllers have applied white noise to the controlled system input to determine the controlled system's response characteristics. Other adaptive controllers have superimposed discrete interval binary noise on a controlled system's input in order to determine the controlled system's response characteristics. Still other adaptive controls have used a mathematical model of the controlled system. The model is fed control signals at the same time that the real system is fed the same control signals. The actual system's response and the model system's response are compared and any difference is used to adjust the actual system's forward gain until the actual system behaves just like the model.

SUMMARY OF THE INVENTION

The present invention provides an adaptive control system which does not require detailed knowledge of the process or mechanism being controlled. In fact, the only assumption about the controlled process or system is that reducing the forward gain of the control loop will increase system stability. Moreover, the adaptive control system of the present invention is not responsive to the magnitude of an error signal but only to the stability of the system's overall response.

In carrying out the present invention an error signal of a closed loop control system is processed and used to vary the overall gain of the system. Specifically, the error signal is first squared and the resulting signal is differentiated. The differentiated signal is used as a trigger for a switching device which produces a selectable positive output whenever the differentiated signal is positive and a selectable negative output whenever the differentiated signal is negative. The output of the switching device is integrated and used to vary the forward gain of the system.

The system may be embodied in electronic circuitry in which case the switching device may be a pulse width modulation circuit. By selecting the ratio between the positive and negative outputs of the pulse width modulation circuit, the damping ratio and thus the stability of the system may be controlled. The present invention adjusts the gain of the controlled system or process to maintain a predetermined margin of stability. Further, the pulse width modulation circuit may have a threshold so that it produces no output, either high or low, until the magnitude of the derivative signal exceeds a minimum or threshold level.

The invention then comprises the features hereinafter fully described and particularly pointed out in the claims, the following description and the annexed drawings setting forth in detail an illustrative embodiment of the invention, this being indicative, however, of but one of the various ways in which the principles of the invention may be carried out.

BRIEF DESCRIPTION OF THE DRAWINGS

In the annexed drawings:

FIG. 2 illustrates graphically four curves A-D representing signals at different locations in the system of FIG. 1.

DESCRIPTION OF PREFERRED EMBODIMENT

Figure 1:
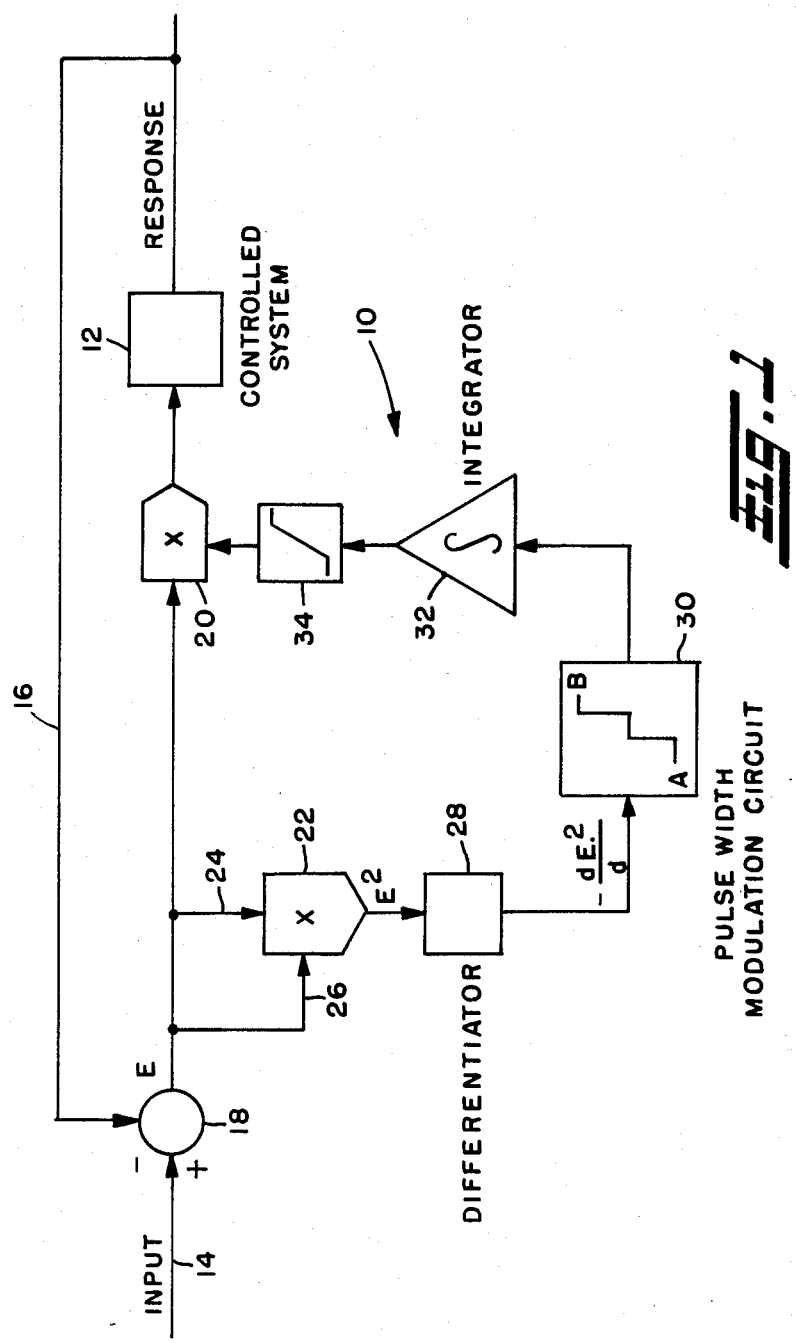
FIG. 1 illustrates schematically a system embodying the present invention.

The present invention utilizes Liapunov's Second or Direct Method of determining a control system's stability and corrects the gain of the forward loop of the controlled system to maintain a preselected margin of stability. This description will proceed first with an explanation of how and why the present invention works from a theoretical approach and then will describe one embodiment of an apparatus for practicing the invention. It will be clear from this theoretical discussion that many other embodiments of the present invention are possible. Specifically, although the embodiment illustrated and described is an electronic control system, it is contemplated that the present invention could be utilized in fluidic control systems, mechanical control systems, optical control systems, or any other type of control system.

Liapunov functions have the characteristic that their derivative with respect to time can be used to measure the stability of any closed loop control system. The time derivative is negative for systems that are stable and positive for systems that are unstable. (Liapunov functions are well known to those skilled in the art and a full explanation of the criteria for determining that the square of the difference between the measured and desired values of a controlled parameter of a closed loop system, $E^2$, is such a function would unnecessarily lengthen this application.) Liapunov's work is broadly applicable to all closed loop systems, however it can most easily be understood in terms of a system which behaves like a damped harmonic oscillator. In such a system the magnitude of the error signal following a step or unit input is $$E = E_0 e^{-\zeta \omega t} \sin \omega t \tag{1}$$

where:
 E = controlled system error
 $E_0$ = initial error in controlled system
 $\zeta$ = damping ratio
 $\omega$ = natural frequency
 t = time.

It is known that $\zeta$ is positive for stable systems and negative for unstable systems and that in designing a control system the choice of $\zeta$ controls the responsiveness of the system. If the error signal (E) is squared ($E^2$)

the resulting expression meets the requirements of a Liapunov function.

In the case of a damped harmonic oscillator $$d(E^2)/dt = E_0^2 e^{-2\zeta\omega t}[-2\zeta\omega \sin^2 \omega t + 2\omega \sin \omega t \cos \omega t] \quad (2)$$

An examination of this expression discloses why it may be used to measure the stability of a system. The terms outside the bracket on the righthand side of equation (2) provide an exponential envelope that decreases with time, making the system stable, when the damping ratio is positive. The envelope increases with time when the system is unstable, i.e. when the damping ratio is negative. The term in equation (2) inside the brackets has two components, the first of which is always negative when $\zeta$ is positive, i.e. when the system is stable. The second term inside the brackets oscillates evenly above and below the time axis. When these two terms are added and averaged over time, the sum is negative for $\zeta > 0$. Thus whenever a system described by equation (1) is stable, the time integral of equation (2) will be negative and proportional to the damping ratio. From the above it is clear that the time averaged value of equation (2) is a measure of system stability.

Again it is worth noting that for any controlled system whether linear or nonlinear, the difference between actual output and desired output, when squared, meets the requirements of a Liapunov function. Therefore although the above explains the operation of the Liapunov function for a damped harmonic oscillator, it will be appreciated that the result is the same for other systems, including nonlinear systems.

It is considered desirable for an adaptive gain control to be sensitive only to the changing stability of the system as a whole and not to the magnitude of an error signal. Evaluating the lefthand side of equation (2) one finds that $$d(E^2)/dt = 2E(dE/dt) \quad (3)$$

This expression is clearly directly proportional to the magnitude of the error signal. Therefore using the time integral of equation (2) to control the overall system gain has the disadvantage of being dependent on the amplitude of the error signal, E.

This disadvantage can be overcome by utilizing a pulse width modulation circuit. Such a circuit has two output states, one positive and one negative. Such a circuit may be switched between output states as the value of equation (2) changes sign. The result is a series of square wave pulses alternating between predetermined positive and negative values and whose width is proportional to the length of time that the time derivative of the error signal squared, i.e. equation (2), is positive or negative, respectively. The resulting train of pulses is independent of the magnitude of the error signal.

If the output train of square waves from the pulse width modulation circuit is integrated over time, the result is a signal either positive or negative proportional to the time integral of the time derivative of the error signal squared ($\int d(E^2)/dt \, dt$) but completely independent of the magnitude of the error signal (E). This signal is a measure of system stability, i.e. it is proportional to $\zeta$, the damping ratio, and it can be used to adjust the gain of the controlled process to maintain stability. For example, if in response to some input to the controlled process, the integrated output of the pulse width modulation circuit is positive, indicating that the system is unstable, the gain of the controlled process is adjusted downward until the integrated output of the pulse width modulation circuit is zero.

A system operating as just described would always operate on the very margin of stability, with a damping ratio of zero. It is usually preferable to operate controlled processes with some margin of stability, i.e. with the damping ratio having some relatively small positive value, usually between 0.5 and 1.5. This can be accomplished in a number of ways. One way would be to add a selectable amount to the integrated output of the pulse width modulation circuit. This would provide a margin of stability related to the selected additional amount. Another way, as will be discussed more fully below, is to vary the ratio between the amplitudes of the positive and negative outputs of the pulse width modulation circuit. This provides any desired specific margin of stability, although the damping ratio and the ratio between the outputs are related not linearly but by a transcendental function.

The invention described above may be carried out in the embodiment shown in FIG. 1. The system 10 includes a controlled system or process 12 which may be a mechanical system such as a position control, possibly a wing surface on a missile or aircraft or the arm of a robot which must work in varying environments such as in and out of water. The controlled system 12 could also be a process such as a chemical process where the chemical properties at the output of the process are measured and the controlled variable may be a flow control valve, a reactant temperature or reaction mixer speed among others.

The controlled system 12 has input 14 which controls some input parameter of the system 12 to establish or maintain an output parameter or response at a selected value. This value may represent a particular physical relationship between two parts, a chemical composition or concentration of an effluent from a chemical process, or almost any other measurable physical quantity. The value of the parameter to be controlled is measured and fed back to the input through back line 16.

A comparator 18 (shown as a summing junction) measures the difference between input 14, representing the desired value of the controlled parameter and the actual value of the controlled parameter transmitted from feed back line 16. The resultant error signal, E, is fed through amplifier 20 to operate system 12.

The amplifier 20 may be a conventional electronic amplifier in which the output is generally proportional to the input. However the term amplifier, as used in this specification and the claims that follow also encompasses the broader concept of any system or group of components which receive an input signal and produce a larger or modified output signal. One example is a hydraulic system which includes a source of fluid under pressure and a proportional flow control valve. Such a system, taken as a whole, has a gain which may be controlled according to the precepts of the present invention. In the example given, the gain could be varied by adjusting the pressure upstream of the proportional flow control valve.

The response of system 12, as indicated by the error signal, E, to a unitary or step input may take the shape of curve A in FIG. 2. The controlled system 12 and the feed back loop 16, comparator 18 and amplifier 20 together form a conventional feed back control system where the gain of amplifier 20 controls the damping ratio of the system and thus the system stability. The only requirement to guarantee applicability of the present invention to controlling system 12 is that the stability of system 10 may be increased by decreasing the gain of amplifier 20. Very many systems of practical interest meet this criterion.

The adaptive control of the present invention varies the gain of amplifier 20 in response to the error signal (E) so that the system 10 is maintained at a consistent, selectable margin of stability. To this end the system 10 also includes an amplifier 22 which receives the error signal through wires 24 and 26 and squares the error signal E. The resultant ($E^2$) is shown, for example, as curve B in FIG. 2. The $E^2$ signal is then differentiated with respect to time by differentiator 28 which also inverts the signal. The differentiator is selected with a break frequency one or two orders of magnitude greater than that of any other element of the controlled system 12 so that the differentiator's own response does not affect system performance. Curve C of FIG. 2 shows the negative of the derivative of the error signal squared with respect to time. The output of the differentiator 28 is a signal which, as shown in FIG. 2, passes above and below zero and which spends more time on the positive side of zero when the system 10 is stable and therefore has a positive damping ratio.

The output of differentiator 28 is fed to a pulse width modulation (PWM) circuit 30. This circuit has two levels of output, one a positive voltage B and the other a negative voltage A. The output of the PWM circuit 30 is A whenever the output of the differentiator 28 is negative, and the output of the PWM circuit 30 is B whenever the output of the differentiator 28 is positive. The resulting train of square wave pulses is shown as curve D in FIG. 2.

The PWM circuit 30 also has a dead band during which its output is zero. The PWM circuit does not respond at all unless the absolute value of the signal received from differentiator 28 exceeds some minimum value. The dead band is shown by the phantom lines crossing the curve C in FIG. 2 and by the horizontal portions of curve D which coincide with the X axis of that curve. This dead band is effective to prevent changes in system gain at amplifier 20 unless the stability of the system has changed more than a predetermined minimum amount.

The output from the PWM circuit 30 is fed to an integrator 32 whose output represents the sum of the area under the curve D of FIG. 4, i.e., positive areas minus negative areas. The integrator 32 is selected with a break frequency approximately one-half the break frequency of the controlled system 12. This assures that the integration occurs over a sufficient length of time to reflect accurately the average of the train of square wave pulses. When the output of integrator 32 is positive, the system 10 is stable, and when the output of integrator 32 is negative, the system is unstable. The degree above or below zero of the output of integrator 32 is a measure of the degree of stability or instability of the system 10. The output of the integrator 32 is fed through a limiter 34 which limits the maximum and minimum values of the gain of amplifier 20.

In response to a change in input 14, an error signal will be generated. The oscillations of the error signal may indicate that the stability of the system is decreasing. In this case the output of integrator 32 will decrease because of the increased amount of time the output of differentiator 28 spends below the zero axis. This decrease in turn will decrease the gain of amplifier 20. The gain of amplifier 20 will continue to fall until the time derivative output spends as much time in the positive region as in the negative region. If the oscillations of the error signal indicate increasing stability, the gain of amplifier 20 would be increased.

The PWM circuit 30 also serves to establish a margin of stability for the system 10. Specifically, the ratio of the values of A and B as outputs of the PWM circuit 30 controls the margin of stability by controlling the damping ratio of the system 10. As can be seen from FIG. 2 the output of the PWM circuit 30 has a wave form that is repeated every 180° of rotation of the vector ωt. This repeating unit has two portions, the positive one having a width 90°+δ, where δ is an offset angle and the negative one having a width 90°−δ. For a single repeating unit, the area above the curve is B(90°+δ), and the area below the curve is A(90°−δ). The adaptive control circuit changes the gain of amplifier 20 until $$B(90°+\delta)=A(90°-\delta) \tag{4}$$

The relationship between δ and ζ can be relatively easily derived. When $$\omega t = 90° - \delta \tag{5}$$

equation (2)=0. So at that time $$2\zeta\omega \sin^2 \omega t = 2\omega \sin \omega t \cos \omega t \tag{6}$$

This reduces to $$\omega t = \tan^{-1} 1/\zeta \tag{7}$$

Substituting Equation (5) into Equation (7) and solving for yields $$\delta = \tan^{-1} \zeta \tag{8}$$

Therefore, when δ=0, ζ=0, which represents a condition of zero stability and which is therefore usually very undesirable. Equations (4) and (8) can be combined to obtain $$\tan^{-1} \zeta = 90°(A-B/A+B) \tag{9}$$

Equation (9) shows that any desired damping ratio can be obtained by varying A and B. The gain of amplifier 20 will still be changed until the areas above and below the zero axis of curve D (FIG. 2) are equal, but this equality will occur at some desired stability margin represented by a selected positive damping ratio.

As noted above the control system 10 was described as an electronic system. However it should be clear that components of other types may be used. For example, but not by way of limitation, fluidic components which carry out each of the functions required by the block diagram of FIG. 1 are known, and the system could be carried out using such fluidic components. Further the system could be carried out using mechanical components, or optical components or any combination of such components as may be suited to the particular system 12 being controlled and its environment.

Thus the adaptive control system of the present invention varies the forward gain of a controlled system 12 to maintain a desired margin of stability. Unlike other adaptive control systems, no detailed knowledge of the frequency response of controlled system 12 is required. Instead, the error signal squared ($E^2$), which satisfies the requirements of a Liapunov function, is used to measure system stability. Specifically, the error signal squared is differentiated with respect to time, and the derivative so obtained is used to trigger a pulse width modulation (PWM) circuit 30 which has a fixed positive output whenever the time derivative is positive and a fixed negative output whenever the time derivative is negative. The output of the PWM circuit 30 is integrated by integrator 32, and the result is a signal representing the difference between the length of time the time derivative of $E^2$ is positive and the length of time the time derivative of $E^2$ is negative, and thus under the Liapunov theory is a measure of system stability. The output of integrator 32 is used to control the forward loop gain, returning the controlled system 12 to a margin of stability determined by the values of the fixed positive and negative outputs of the PWM circuit 30.

The following is claimed:

1. An adaptive control method for controlling a parameter of a process or mechanism comprising the steps of measuring the value of the parameter, comparing the measured value with a desired value to obtain an error signal, squaring the error signal, taking the time derivative of the error signal squared, comparing the length of time that the time derivative of the error signal squared has a positive value to the length of time the time derivative of the error signal squared has a negative value to obtain a gain control signal, applying the error signal to the system through an amplifier whose gain is controlled by said gain control signal to adjust the parameter desired to be controlled.

2. The method of claim 1 wherein said step of comparing the length of time the time derivative of the error signal squared is positive and the length of time it is negative includes the steps of triggering a pulse width modulation circuit with the time derivative of the error signal squared and integrating the output of the pulse width modulation circuit.

3. The method of claim 2 wherein said step of triggering the pulse width modulation circuit includes the steps of triggering the pulse width modulation circuit only when the absolute value of the time derivative of the error signal squared exceeds a predetermined value.

4. The method of claim 2 further including the steps of multiplying the length of time the time derivative of the error signal squared is positive by a preselected constant and comparing the result with the length of time said time derivative of said error signal squared is negative.

5. The method of claim 1 including the step of limiting the maximum and minimum gain of said amplifier control through which the error signal is applied to the system.

6. In a system having a process with a controlled parameter, an error signal representing the difference between the actual and desired values of the controlled parameter and a variable gain amplifier for applying the error signal to the process to alter the controlled parameter, the method of controlling the gain of said amplifier including varying the gain of said amplifier in response to the integral of a pulse width modulation circuit triggered by a changing sign of the time derivative of the square of the error signal.

7. The method of claim 6 including limiting the maximum and minimum gain of said amplifier.

8. The method of claim 7 including multiplying the amplitude of the portion of the output of the pulse width modulation circuit which is positive by a selected factor to establish a desired margin of system stability.

9. The method of claim 8 including providing the pulse width modulation circuit with a dead band whereby said circuit does not respond until the absolute value of the time derivative of the error signal squared exceeds a selected value.

10. An adaptive control system for controlling a process having an input, a forward gain and an output, said adaptive control system including
    means for measuring the value of said output,
    means for comparing the value of said output with a desired value for said output to obtain an error signal,
    means for squaring said error signal,
    means for taking the time derivative of said squared error signal,
    means for computing the sum of the length of time said derivative is positive and the length of time said derivative is negative, and
    means for controlling said forward gain of said controlled process in response to said sum.

11. The adaptive control system of claim 10 wherein said means for computing the sum includes a pulse width modulation circuit.

12. The adaptive control system of claim 11 wherein said pulse width modulation circuit has two output states, one positive and one negative.

13. The adaptive control system of claim 12 wherein said pulse width modulation circuit is triggered by changing sign of said derivative.

14. The adaptive control system of claim 13 wherein said pulse width modulation circuit includes means for adjusting the ratio between said two output states.

15. The adaptive control system of claim 12 wherein said pulse width modulation circuit includes a deadband whereby said pulse width modulation circuit changes output states only when the absolute value of said derivative exceeds a predetermined value.

16. The adaptive control system of claim 10 including means for limiting the maximum and minimum values of said forward gain.

* * * * *